(12) United States Patent
Nishiumi et al.

(10) Patent No.: US 7,902,290 B2
(45) Date of Patent: Mar. 8, 2011

(54) INHIBITION/REDUCTION IN DISCOLORATION OF DIORGANOPOLYSILOXANE COMPOSITIONS

(75) Inventors: Wataru Nishiumi, Ichihara (JP); Hiroshi Adachi, Ichihara (JP); Eiji Horita, Fukui (JP)

(73) Assignee: Dow Corning Toray Company, Ltd., Tokyo (JP)

( * ) Notice: Subject to any disclaimer, the term of this patent is extended or adjusted under 35 U.S.C. 154(b) by 771 days.

(21) Appl. No.: 10/584,232

(22) PCT Filed: Dec. 20, 2004

(86) PCT No.: PCT/JP2004/019494
§ 371 (c)(1),
(2), (4) Date: Apr. 20, 2007

(87) PCT Pub. No.: WO2005/063891
PCT Pub. Date: Jul. 14, 2005

(65) Prior Publication Data
US 2007/0219297 A1   Sep. 20, 2007

(30) Foreign Application Priority Data
Dec. 25, 2003   (JP) ................ 2003-429692

(51) Int. Cl.
*C08L 83/04*   (2006.01)
(52) U.S. Cl. ........................ 524/588; 525/477
(58) Field of Classification Search ......... 524/435, 524/424–425, 860, 81, 86, 99, 102, 588; 528/17–18, 33; 525/477
See application file for complete search history.

(56) References Cited

U.S. PATENT DOCUMENTS

| 3,995,184 | A | * | 11/1976 | Insley ................. 313/131 A |
| 4,391,937 | A |   | 7/1983 | Falender et al. |
| 5,378,406 | A | * | 1/1995 | Nagaoka ................. 252/511 |
| 5,733,996 | A |   | 3/1998 | DeBuyl et al. |
| 6,451,437 | B1 | * | 9/2002 | Amidaiji et al. ............. 428/447 |

FOREIGN PATENT DOCUMENTS

| EP | 0076630 A2 | 4/1983 |
| EP | 0747443 A2 | 12/1996 |
| EP | 1290943 A1 | 3/2003 |
| JP | 58071951 | 4/1983 |
| JP | 9003330 | 1/1997 |
| JP | 9087611 | 3/1997 |

OTHER PUBLICATIONS

Merriam-Webster's Collegiate Dictionary, 10th Ed., Merriam-Webster, Inc. p. 430 (1993).*
English language abstract for JP9003330 extracted from espacenet.com database Jan. 4, 2007.
English language abstract for JP9087611 extracted from espacenet.com database Jan. 4, 2007.
English language abstract for JP58071951 extracted from espacenet.com database Jan. 4, 2007.

* cited by examiner

*Primary Examiner* — Kuo-Liang Peng
(74) *Attorney, Agent, or Firm* — Howard & Howard Attorneys PLLC

(57) ABSTRACT

A method of inhibiting or reducing discoloration of a diorganopolysiloxane composition comprising the steps of mixing: said composition with the following components in any order: i) a source of ferrous ions; and ii) 0.0001-0.05 wt. % per total weight of the composition of a bis(2-pyridylthio-1-oxide) non-ferrous salt per total weight of the composition.

17 Claims, No Drawings

INHIBITION/REDUCTION IN DISCOLORATION OF DIORGANOPOLYSILOXANE COMPOSITIONS

RELATED APPLICATIONS

This application claims priority to and all the advantages of International Patent Application No. PCT/EP2004/019494, filed on Dec. 20, 2004, which claims priority to Japanese Patent Application No. JP 2003-429692, filed on Dec. 25, 2003.

TECHNICAL FIELD

The present invention relates to a method for inhibiting or reducing discoloration of a diorganopolysiloxane composition, a discoloration Inhibiting/reducing Agent and Diorganopolysiloxane Compositions comprising said discoloration Inhibiting/reducing Agent.

BACKGROUND ART

It is well known that over extended periods of storage diorganopolysiloxane compositions may discolor. An example of such a diorganopolysiloxane composition comprises an alkoxysilyl terminated diorganopolysiloxane and an alkoxysilane. Such compositions are generally cured at room temperature by de-alcoholation in the presence of a suitable catalyst (e.g. a titanium compound). Since this composition is odor-free and does not cause corrosion of metals, it is used as an adhesive agent and sealant in the electrical, electronic, and construction industries. However, after storage for extended periods of time, this composition is subject to yellowing, the intensity of which increases with time.

The reason why yellowing of the aforementioned diorganopolysiloxane composition occurs is not completely clear, but it may generally be assumed that one of the main causes of this phenomenon is the presence of an organo-titanium compound used as the curing catalyst. Other factors which cause discoloration may include the use of additives such as amine-containing silane coupling agents or the like.

If the diorganopolysiloxane composition has changed its color during storage, products obtained from such composition will also change their appearance. Therefore, a demand exists for diorganopolysiloxane compositions that will substantially not change color during storage or only change color to an insignificant degree. Change of color becomes especially visible in various white and light-color sealants, which are most frequently used and therefore are in need of discoloration-resistant properties.

Japanese Laid-Open Patent Application Publication (hereinafter referred to as Kokai) S58-71951 (equivalent to EP0076330) discloses the elimination or decrease in discoloration of diorganopolysiloxane compositions of various types by means of the introduction of an ester of a thioalkane acid, a di-tertbutylphenol-containing compound, and/or an organic titanium compound chelated with an organic phosphite.

Kokai H9-3330 (equivalent to EP0747443) discloses the prevention of discoloration in a diorganopolysiloxane composition by utilizing an organo-titanium compound of a specific molecular structure.

Disadvantages of the above-described prior-art techniques include the facts that they are only efficient against discoloration due to the effects from organo-titanium compounds and that these methods are costly.

Kokai H9-087611 describes a yellowing-proof silicone sealant comprising a polyether-alumina-treated titanium oxide pigment and a hindered amine photostabilizer. Zinc pyrithione is used as an anti-fungal agent. This document teaches that, without the presence of the hindered amine stabilizer, the antifungal agent (zinc pyrithione, otherwise known as zinc (2-pyridylthio-1-oxide)) will deteriorate when subjected to ultra violet light resulting in an increased tendency for the sealant to yellow and for a loss of gloss on the surface, both due to the bleeding out of the antifungal agent from the sealant. The presence of the hindered amine stabilizer in the sealant is said to prevent the decomposition of the fungicide.

DISCLOSURE OF THE INVENTION

It is an object of the present invention to eliminate disadvantages of the prior-art technique. A more specific object of the invention is to inhibit or to reduce discoloration of diorganopolysiloxane compositions in long-term storage with the use of means which are inexpensively and independently of the source of discoloration.

The inventors have found that discoloration of diorganopolysiloxane compositions may be inhibited or reduced by adding to these compositions a mixture of one or more (2-pyridylthio-1-oxide) non-ferrous metal salts and a source of iron (II), hereafter referred to as ferrous, ions.

BEST MODE FOR CARRYING OUT THE INVENTION

In accordance with the present invention there is provided a diorganopolysiloxane composition comprising a source of ferrous ions and 0.0001-0.05 wt. % of a bis(2-pyridylthio-1-oxide) non-ferrous metal salt.

The source of ferrous ions and bis(2-pyridylthio-1-oxide) non-ferrous metal salt are provided for use as a discoloration-inhibiting or reducing agent.

Any suitable source of ferrous ions may be incorporated in the composition. A suitable source of ferrous is intended to mean a source of ferrous ions which in the presence of a non-ferrous bis(2-pyridylthio-1-oxide) metal salt will exchange with the non-ferrous metal ions to form a ferrous (2-pyridylthio-1-oxide) salt in-situ. Such a source of ferrous ions may comprise an iron oxide (II), iron sulfide (II), iron (II) chloride, iron (II) fluoride, iron garnet or a similar iron (II) compound. A particularly preferred source of ferrous ions is Iron (II) oxide. The source of ferrous ions may also comprises other oxides of iron, e.g. $Fe_2O_3$ and/or $Fe_3O_4$, or other iron compounds which are reducible in situ thereby resulting in being a source of ferrous ions.

The aforementioned source of ferrous ions may be added to the diorganopolysiloxane composition as a separate component, or as an impurity contained in another component. For example, in case where the diorganopolysiloxane composition comprises an inorganic filler such as calcium carbonate, a source of ferrous ions may be present in the composition as an impurity of the calcium carbonate inorganic filler. There are no special restrictions with regard to an amount in which a ferrous compound may be present in the diorganopolysiloxane composition, but in general, the content of the ferrous compound should be greater than 10 ppm, preferably greater than 20 ppm, even greater than 50 ppm per total weight of the composition, and most preferably greater than 100 ppm. A filler containing a ferrous compound may comprise, e.g., a calcium carbonate originated from a natural limestone that contains 0.1 to 0.4 wt. % of iron (II) oxide as an inherent impurity.

Any suitable bis(2-pyridylthio-1-oxide) non-ferrous metal salt may be utilized in the present invention. A bis(2-pyridylthio-1-oxide) non-ferrous metal salt suitable for the purposes of the present invention may be represented by the following formula:

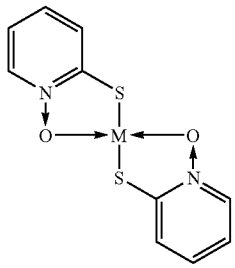

(where M is a metal other than iron); M may for example comprise zinc, copper, or a similar non-ferrous metal. In order to prevent undesired coloring during compounding with diorganopolysiloxane by the color inherent in this metal salt, it is recommended to use a white bis(2-pyridylthio-1-oxide) zinc salt.

In the presence of ferrous ions, under the effect of a metal ion-exchange reaction the bis(2-pyridylthio-1-oxide) non-ferrous metal salt is turned directly into a bis(2-pyridylthio-1-oxide) ferrous salt (iron pyrithione). Since the bis(2-pyridylthio-1-oxide) ferrous salt has a bluish color, the discoloration of diorganopolysiloxane composition, i.e., yellowing, is offset, and thus it becomes possible to inhibit or reduce discoloration of the diorganopolysiloxane composition.

If the diorganopolysiloxane composition contains a source of ferrous ions, the amount of the produced bis(2-pyridylthio-1-oxide) ferrous salt will gradually increase. This is because ferrous ions are gradually being extracted from the aforementioned source of ferrous ions, e.g. iron (II) oxide. Therefore whilst the yellowing effect in the diorganopolysiloxane composition would normally intensify with age, in the composition of the present invention the yellowing discolouration is offset or compensated for by the gradual increase in the amount of bis(2-pyridylthio-1-oxide) ferrous salt formed which inhibits or reduces the degree of discoloration of the aforementioned composition over an extended period of time.

It is to be appreciated that the composition of the present invention does not chemically eliminate the source of discoloration of the diorganopolysiloxane composition, i.e. the process which usually causes the yellowing discolouration will still occur as time goes by. However, the composition of the present invention visually inhibits or reduces the apparent visual discoloration of the composition by means of the complementary coloring effect caused by the generation of bis(2-pyridylthio-1-oxide) ferrous salt within the composition. Thus, the invention makes it possible to inhibit or reduce discoloration of the diorganopolysiloxane compositions during long-term storage irrespective of the sources that may cause discoloration with the lapse of time.

It is recommended to use the bis(2-pyridylthio-1-oxide) non-ferrous metal salt in an amount of 0.0001-0.05 wt. %, preferably 0.0005-0.02 wt. %, and even more preferably, 0.001-0.01 wt. %, and even further preferably, 0.002-0.005 wt. % of the total weight of the diorganopolysiloxane composition If the aforementioned non-ferrous metal salt is used in an amount of less than 0.0001 wt. %, it would be difficult to obtain a sufficient discoloration inhibiting effect. If, on the other hand, the aforementioned salt is used in an amount exceeding 0.05 wt. %, a cured body obtained from the organopolysiloxane composition with a relatively large amount of the bis(2-pyridylthio-1-oxide) ferrous salt, and especially the inner part of this body, will become blue.

The aforementioned bis(2-pyridylthio-1-oxide) non-ferrous metal salt can be added to the diorganopolysiloxane composition directly or can be added as a mixture of diorganopolysiloxane and bis(2-pyridylthio-1-oxide) non-ferrous metal salt.

Practical examples disclosed in Kokai 9-87611 show that in concentrations above a certain value the bis(2-pyridylthio-1-oxide) zinc salt may be used in diorganopolysiloxane compositions as an anticorrosive agent. However, the inventors have found that contrary to the prior art teaching, the introduction of very small concentrations of bis(2-pyridylthio-1-oxide) non-ferrous salts, e.g., below 0.05 wt. %, the composition results in the apparent substantial loss of its anticorrosive properties. The present invention makes it possible to use the bis(2-pyridylthio-1-oxide) zinc salt, which is added in minute quantities as an agent for inhibiting or reducing discoloration of diorganopolysiloxane compositions in accordance with the present invention and not as an anticorrosive agent.

Any suitable standard ingredients may be utilized in the present invention, i.e. this may be any composition of the aforementioned type that is subject to discoloration with the lapse of time. For example, it may be a de-alcoholation-curable, de-oximation-curable, de-amidation-curable, or a similar condensation-reaction type diorganopolysiloxane composition curable at room temperature. The de-alcoholation-type diorganopolysiloxane composition curable at room temperature is most preferable since it does not produce an odor and does not cause corrosion of metals.

Typically the composition will comprise a suitable organopolysiloxane polymer, and a suitable curing system (e.g. a catalyst and where appropriate a cross-linker) and optionally a suitable filler.

For the sake of example a dealcoholation-type room-temperature-curable diorganopolysiloxane composition of the present invention may comprise, the following components (A) to (D):

(A) a diorganopolysiloxane base;
(B) an inorganic filler, preferably calcium carbonate powder that contains iron oxide as an impurity;
(C) an alkoxysilane or a partially hydrolyzed product thereof; and
(D) a curing catalyst.

It is required that the main constituent (A-1) of component (A) has hydroxyl groups or hydrolyzable groups at both molecular terminals.

There are no special restrictions with regard to the aforementioned hydrolyzable groups, and they may comprise, alkoxy groups, alkoxysilyl groups, alkoxy-substituted alkoxy groups, ketoxime groups, acyloxy groups, aminoxy groups, or the like. The alkoxy or alkoxysilyl groups are preferable. The alkoxy groups may be represented by methoxy groups, ethoxy groups, propoxy groups, isopropoxy groups t-butyl groups or similar alkoxy groups having 1-4 carbon atoms. The alkoxysilyl groups may be represented by the following general formula:

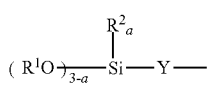

where each $R^1$ is the same or different and may be selected from an alkyl group or an alkoxy-substituted alkyl group; each $R^2$ is the same or different and may be selected from a monovalent hydrocarbon group, halogenated hydrocarbon group, and cyanoalkoxy group; a is 0, 1 or 2; and Y is oxygen, a divalent hydrocarbon group or a group represented by the following general formula:

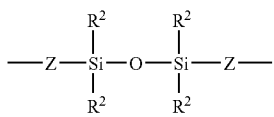

(where $R^2$ is the same as defined above; and Z is a divalent hydrocarbon group)}.

Thus, constituent (A-1) may be represented by the following general formula:

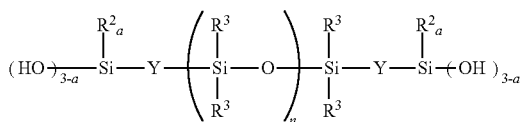

(where $R^2$, a, and Y are the same as mentioned above; each $R^3$ is the same or different and may be selected from a monovalent hydrocarbon group, halogenated hydrocarbon group, and cyanoalkoxy group; n is an integer that provides viscosity at 25° C. within the range of 20-1,000,000 mPa·s). Constituent (A-1) may alternatively be represented by the following general formula:

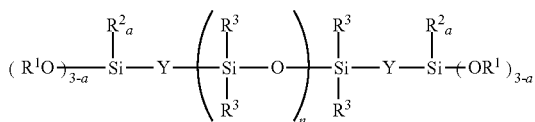

(where $R^1$, $R^2$, $R^3$, a, n, and Y are the same as defined above).

Methods for the preparation of the aforementioned diorganopolysiloxanes are known. For example, the following methods are suitable: a method based on an addition reaction between a hydrosilyl group terminated diorganopolysiloxane and an alkenyltrialkoxysilane or an alkenylalkyldialkoxysilane; a method based on an addition reaction between a diorganopolysiloxane having both molecular terminals capped with alkenylsilyl groups and trialkoxysilane or an alkenyltrialkoxysilane or an alkyldialkoxysilane; and a method based on a de-alcoholation and condensation reaction between a diorganopolysiloxane having both molecular terminals capped with hydroxysilyl and a tetraalkoxysilane or alkyltrialkoxysilane.

In addition to constituent (A-1) component (A) may comprise a constituent (A-2) in the form of a diorganopolysiloxane having a hydroxyl or a hydrolysable group on only one of the molecular terminal and/or a constituent (A-3) comprising a diorganopolysiloxane having no hydroxyl or a hydrolysable terminal groups. The use of constituents (A-2) and/or (A-3) together with (A-1) improves the adhesive properties of diorganopolysiloxane base (A) and/or allows adjustment of properties in the cured body by appropriately decreasing the modulus of elasticity. Preferably the viscosity of the diorganopolysiloxane of component (A) at 25° C. is within the range of from 20 to 1,000,000 mPa·s, more preferably, within the range of from 1,000 to 100,000 mPa·s.

Constituent (A-2) may be represented, e.g., by the following general formula:

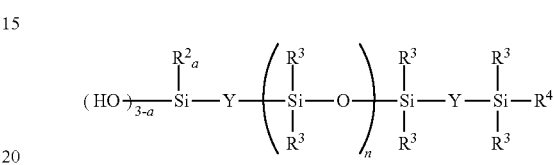

(where $R^2$, $R^3$, a, n, and Y are the same as defined above; $R^4$ designates an alkyl or alkenyl group).

Constituent (A-2) may alternatively be represented, e.g., by the following general formula:

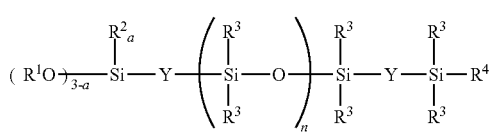

(where $R^1$, $R^2$, $R^3$, $R^4$, a, n, and Y are the same as defined above).

Methods of manufacturing diorganopolysiloxanes of the type defined as constituent (A-2) are known. For example, they may be prepared by the following methods: conducting an addition reaction between a diorganopolysiloxane having a monoalkoxysilyl group on one of the molecular terminals and a hydrosilyl group on the other molecular terminal and an alkenyltrialkoxysilane or alkenylalkyldialkoxysilane; conducting an addition reaction between a diorganopolysiloxane having a monoalkoxysilyl group on one of the molecular terminals and a vinylsilyl group on the other molecular terminal and a trialkoxysilane or alkyldialkoxysilane; or conducting a de-alcoholation and condensation reaction between a diorganopolysiloxane having a monoalkoxysilyl group on one of the molecular terminals and a silanol group on the other molecular terminal and a tetraalkoxysilane or alkyltrialkoxysilane.

Diorganopolysiloxanes that are suitable for the aforementioned method and have one molecular terminal capped with a monoalkoxysilyl group and another with a hydrosilyl group, vinylsilyl group, or a silanol group may be produced, e.g., by subjecting a hexaalkylcyclotrisiloxane to ring-opening polymerization with the use of a dialkylalkoxysiloxylithium as a polymerization initiator, and then neutralizing the product with a dialkylchlorosilane, alkenyldialkylchlorosilane, or a carboxylic acid, respectively.

Constituent (A-3) may be the one represented, e.g., by the following general formula:

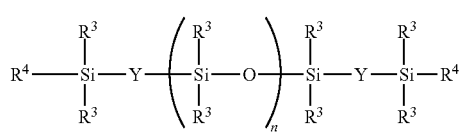

(where $R^3$, $R^4$, a, n, and Y are the same as defined above).

Such diorganopolysiloxane may comprise, e.g., a known diorganopolysiloxane having both molecular terminals capped with trialkylsilyl groups.

In all of the above formulae, alkyl groups may be represented by methyl groups, ethyl groups, propyl group, butyl group, isopropyl groups or t-butyl groups or similar alkyl groups having 1 to 4 carbon atoms, as well as by cyclopropyl groups, cyclobutyl groups, cyclopentyl groups, cyclohexyl groups, or similar cycloalkyl groups having 3 to 8 carbon atoms. Alkoxy-substituted alkyl groups may be represented by alkyl groups having 1 to 4 carbon atoms substituted with one or more alkoxy groups having 1 to 4 carbon atoms such as for example methoxyalkyl and/or ethoxyalkyl groups such as methoxyethyl groups, ethoxyethyl groups, methoxypropyl groups, methoxybutyl groups.

In addition to the aforementioned alkyl groups with 1 to 4 carbon atoms and cycloalkyl groups with 3 to 8 carbon atoms, the monovalent hydrocarbon groups may be represented, e.g., by vinyl groups, allyl group, and similar alkenyl groups with 2 to 6, preferably 2 to 4 carbon atoms; phenyl groups, tolyl groups, naphthyl groups, or similar aryl groups; benzyl groups, phenylethyl groups, phenylpropyl groups, or similar aralkyl groups. Halogenated hydrocarbon groups may be represented by chloromethyl groups, trifluoropropyl groups, chloropropyl groups or similar halogenated alkyl groups with 1 to 4 carbon atoms. Cyanoalkyl groups may be exemplified by β-cyanoethyl groups, γ-cyanopropyl groups, or similar cyano-substituted alkyl groups with 1 to 4 carbon atoms. Divalent hydrocarbon groups may be substituted or non-substituted alkylene groups with 2 to 4 carbon atoms. Such as for example methylene groups, propylene group or butylene groups.

Alkenyl groups may be represented by vinyl groups, allyl groups, hexenyl groups or similar alkenyl groups with 2 to 6 and preferably 2 to 4 carbon atoms.

In the case when, in addition to constituent (A-1) component (A) also contains constituent (A-2) and/or constituent (A-3), preferably constituent (A-1) is present in an amount of 20 to 95 wt. %, preferably 30 to 90 wt. %, and even more preferably, 40 to 80 wt. % per total weight of component (A).

If component (A) contains constituent (A-2), constituent (A-2) should be added in an amount of less than 80 wt. %, preferably within the range of 0.5 to 40 wt. %, and even more preferably, within the range of 1.0 to 20 wt. % per total weight of component (A). If the composition contains constituent (A-3), constituent (A-3) should be added in an amount of less than 80 wt. %, preferably within the range of 0.1 to 40 wt. %, and even more preferably, within the range of 0.5 to 15 wt. % per total weight of component (A).

Any suitable reinforcing and/or non-reinforcing filler material comprising one or more of finely divided treated or untreated precipitated or fumed silica; precipitated or ground calcium carbonate, zinc carbonate; clays such as finely divided kaolin; quartz powder; aluminum hydroxide; zirconium silicate; diatomaceous earth; wollastonite; pyrophylate; and metal oxides such as fumed or precipitated titanium dioxide, cerium oxide, magnesium oxide powder, zinc oxide, and iron oxide. These may also include glass fibre; talc; aluminite; calcium sulphate (anhydrite); gypsum; calcium sulphate; magnesium carbonate; magnesium hydroxide (brucite); graphite; barite, a form of barium sulphate; copper carbonate, eg malachite; nickel carbonate, eg zarachite; barium carbonate, eg witherite; strontium carbonate eg strontianite, or a similar inorganic filler. Most preferably the filler is a precipitated or ground calcium carbonate containing iron (II) oxide in minute quantities in the form of a natural impurity or as a specially added constituent.

A precipitated calcium carbonate suitable for use as component (B) is normally obtained by dehydrating and then drying a calcium carbonate slurry produced by treating high-density limestone with carbon dioxide. It is recommended that the aforementioned calcium carbonate has BET specific surface area greater than 5 m$^2$/g and preferably greater than 10 m$^2$/g. In order to facilitate dispersion in component (A) and for obtaining improved viscosity characteristics, it is recommended to use calcium carbonate surface-treated with a fatty acid or a rosin acid. A precipitated calcium powder is a commercially available product that may be obtained, e.g., from Shiroishi Industries, Ltd. as a product commercially known as Hakuenka CC, or from Maruo Calcium Co., Ltd. under trademark Calfine 200.

A ground calcium carbonate suitable for use as component (B) is normally obtained by grinding white limestone and subjecting the obtained crushed product to classification. It is recommended that the aforementioned ground calcium carbonate has a BET specific surface area greater than 8 m$^2$/g and preferably greater than 10 m$^2$/g. In order to facilitate dispersion in component (A) and for obtaining improved viscosity characteristics, it is recommended to use calcium carbonate surface-treated with a fatty acid or a rosin acid. It is also recommended that oil absorption (according to JIS K5101) be within the range of 15 to 40 ml/100 g. The ground calcium carbonate is commercially available and produced by Toyo Fine Chemical Co., Ltd. under trademark "Whiton P-30" and by Maruo Calcium Co., Ltd. under trademark "Nanox #30".

It is required that component (B) is used in an amount of 1 to 300 parts by weight, preferably, 5 to 200 parts by weight, and even more preferably, 10 to 150 parts by weight per 100 parts by weight of component (A). If it is used in an amount of less than 1 part by weight, this will reduce mechanical strength of the composition and impair handling conditions because of decrease in viscosity. If, on the other hand, the added amount of component (B) exceeds 300 parts by weight, a problem will result from extremely high viscosity. In the case where both precipitated calcium carbonate and ground calcium carbonate are used together, a weight ratio of precipitated calcium carbonate to ground calcium carbonate should be within the range of 1.00:1.00 to 1.00:0.01, preferably 1.00:0.70 to 1.00:0.05, and even more preferably, within the range of 1.00:0.40 to 1.00:0.03.

There are no special restrictions with regard to the hydrolysable silane or a product of its partial hydrolyzation that constitutes component (C), provided that this component is represented by the following general formula:

$$R^5{}_b SiX_{4-b}$$

(where each $R^5$ is the same or different and is a monovalent hydrocarbon group for example an alkyl group such as a methyl group, ethyl group, propyl group, butyl group, isopropyl group or t-butyl group, or an alkenyl group such as a vinyl group an allyl group or a similar alkenyl group; X may designate a hydrolysable group such as an alkoxy group e.g. methoxy group, ethoxy group, propoxy group, butoxy group, an alkoxy-substituted alkyl group such as a methoxyethyl group, ethoxyethyl group, methoxypropyl group, methoxybutyl group; an alkenyloxy group such as isopropenoxy group, 1-ethyl-2-methylvinyloxy group; a ketoxime group such as a dimethylketoxime group, methylethylketoxime group; or an acyloxy group such as an acetoxy group, propionoxy group, butyloyloxy group, benzoyloxy group; an amine group such as dimethylaminoxy group, diethylamine group; an aminoxy group such as a dimethylaminoxy group; diethylaminoxy group; an amide group such as N-methylacetoamide group, N-ethylacetoamide group, N-methylbenzoamide group; and b is an integer from 0 to 2). It is recommended to have b equal to 0 or 1. If b is 2, i.e., when a difunctional hydrolysable silane is added, the obtained composition becomes suitable for applications which require that after curing it could be possible to reduce modulus of elasticity in an adhesive agent.

Aforementioned silanes or products of their partial hydrolyzation may be exemplified by the following compounds: methyltrimethoxysilane, methyltriethoxysilane, ethyltrimethoxysilane, ethyltriethoxysilane, butyltrimethoxysilane, butyltriethoxysilane, vinyltrimethoxysilane, phenyltrimethoxysilane, methyltrimethoxyethoxysilane, or a similar trifunctional alkoxysilane; tetramethoxysilane, tetraethoxysilane, tetrapropoxysilane, or a similar tetrafunctional alkoxysilane; methyltris(methoxyethoxy)silane, methyltripropenoxysilane, methyltriacetoxysilane, vinyltriacetoxysilane, methyltri(butanoxime)silane, vinyltri(butanoxime) silane, phenyltri(butanoxime)silane, propyltri(butanoxime) silane, tetra(butanoxime)silane, 3,3,3-trifluoropropyl (butanoxime)silane, 3-chloropropyl(butanoxime)silane, methyltri(propanoxime)silane, methyltri(pentanoxime)silane, methyltri(isopentanoxime)silane, vinyl(cyclopentanoxime)silane, and methyltri(cyclohexanoxime)silane.

The aforementioned silanes or products of their partial hydrolyzation that constitutes component (C) may be used individually or in a mixture of two or more. It is recommended to use component (C) in an amount of 0.5 to 30 parts by weight, preferably, 21 to 25 parts by weight per 100 parts by weight of component (A). If the added amount of component (C) is too small, the composition may be not sufficiently cured, and may be subject to thickening and conversion into gel during storage. If, on the other hand, component (C) is used in excess, this will delay the curing and will increase the production cost.

Component (D), that is used as a curing catalyst, may be exemplified by the following compounds: tetraisopropoxytitanate, tetra-t-butoxytitanate, titanium di(isopropoxy) bis (ethylacetoacetate), titanium-di(isopropoxy)bis(acetylacetonate), or a similar organo-titanium compound); a dibutyltin bisacetylacetonate, tin octylate, or a similar organic tin compound; a lead dioctylate, or a similar metal salt of dicarboxylic acid; zirconium tetraacetylacetonate, or a similar organozirconium compound; aluminum triacetylacetonate, or a similar organo-aluminum compound; hydroxylamine, tributylamine, or a similar amine. Most preferable of these is an organo-titanium compound. The aforementioned curing catalysts should be added in an amount of 0.001 to 10 parts by weight, preferably, 0.01 to 5 parts by weight per 100 parts by weight of component (A). If the curing catalyst is used in a smaller amount than the recommended lower limit, curing will be significantly delayed. If, on the other hand, this catalyst is used in an excessive amount, the composition will loose stability in storage, or a product obtained by curing the composition will loose elasticity.

In order to improved adhesive properties, in addition to the main components the composition may also contain a silane based adhesion promoter such as an amine-containing organotrialkoxysilane, epoxy-containing organotrialkoxysilane, mercapto-containing organotrialkoxysilane, or the like. These silane based adhesion promoter may be used individually or in a mixture of two or more. If necessary, a reaction mixture of organic amine or amine-containing organotrialkoxysilane and epoxy-containing organotrialkoxysilane may be used. Among the above, the highest adhesion-improving effect is obtained with the use of the amine-containing silane based adhesion promoter.

Besides the main components, the composition of the present invention may be combined with various additives normally added to known room-temperature-curable silicone rubber compositions, providing the introduction of these additive does not negatively affect the discolouration inhibiting or reducing properties of the composition in accordance with the present invention. These include where appropriate one or more organic solvent, anticorrosive agent, flame retardant, heat-resistant additive, thixotropy modifiers, adhesion improvers, curing accelerators, and pigments.

The present composition of the invention may be easily prepared, e.g., by uniformly mixing aforementioned components ((A)-(D), if necessary, with appropriate additives, under moisture-free conditions. The composition of the invention may be of so-called one-package type or two-package type, but the former is more appropriate from the perspective of workability. If the composition is of a one-package type, it is stored in a hermetically sealed cartridge or a similar container and is removed from the contained and exposed to the atmospheric air directly prior to use. When the one-package type diorganopolysiloxane composition of the present invention is exposed to air, it is cured under the effect of moisture contained in the air and is turned into a silicone rubber with resilient properties.

The composition may comprise an organopolysiloxane composition curable by means of a condensation reaction. The aforementioned composition may be illustrated by the following specific example: (A-1) 20-100 wt. % of a diorganopolysiloxane capped at both molecular terminals with hydroxyl or hydrolysable groups; (A-2) 0-80 wt. % of a diorganopolysiloxane capped at one molecular terminal with hydroxyl or hydrolysable groups; (A-3) 0-80 wt. % of a diorganopolysiloxane that does not have hydroxyl or hydrolysable groups at both molecular terminals; (B) 1-300 parts by weight of a calcium carbonate powder that contains iron oxide; (C) 0.5-30 parts by weight of a hydrolysable silane or a partially hydrolyzed product thereof; and (D) 0.001-10 parts by weight of a curing catalyst.

The invention is efficient in that it allows inhibiting or reducing of discoloration of diorganopolysiloxane compounds with ease, for a long period of time, and with the use of relatively inexpensive means.

In a further embodiment of the present invention there is provided a method of inhibiting or reducing discoloration of a diorganopolysiloxane composition comprising the steps of introducing the following components in any order or simultaneously:

i) a source of ferrous ions
ii) 0.0001 to 0.05 wt. % of a bis(2-pyridylthio-1-oxide) non-ferrous metal salt per total weight of the composition.

For instance, the method may be provided a two part composition comprising a first part which comprises a diorganopolysiloxane polymer and a bis(2-pyridylthio-1-oxide) non-ferrous salt and a second part comprising a diorganopolysiloxane polymer and a source of ferrous ions and said first part is mixed with said second part.

After mixing the composition is cured and is inhibited from discolouring/yellowing by the ion exchange between the source of ferrous ions and the bis(2-pyridylthio-1-oxide) non-ferrous metal salt resulting in the gradual formation of an increasing amount of ferrous bis(2-pyridylthio-1-oxide). Within the cured matrix of the composition.

In a still further embodiment of the present invention there is provided a discoloration inhibiting or reducing agent for a diorganopolysiloxane composition comprising the reaction product of a bis(2-pyridylthio-1-oxide) non-ferrous metal salt and a source of ferrous ions.

EXAMPLES

The present invention will now be described in more detail with reference to practical and comparative examples.

In the practical and comparative examples given below, viscosity and color characteristics were measured by the methods described below.

Viscosity Measurement Procedure

Viscosity was measured using a viscosimeter (AR-500 Rheometer) from TA Instruments Japan Co Ltd. After application of pressure for 1 min. at a shear rate of 20/s, viscosity was measured at a shear rate of 100/s, geometry of 20 cm and a 2° [cone angle].

Color Determination Process

Color was measured with the use of spectrocolorimeter of Minolta Camera Co., Ltd. (Model No. CM2002). L* axis was used for defining brightness, a* axis was used for defining red/green direction, and b* axis was used for defining yellow/blue direction. L* axis is in the range of 0 (black) to 100 (white). The positive direction on a* axis corresponded to red; the negative direction on a* axis corresponded to green; the positive direction on b* axis corresponded to yellow; the negative direction on b* axis corresponded to blue. Color difference was calculated using the following formulae.

$$\Delta b = b^*(2) - b^*(1)$$

$$\Delta E = \sqrt{(\Delta L)^2 + (\Delta a)^2 + (\Delta b)^2}$$

$$\Delta L = L^*(2) - L^*(1)$$

$$\Delta a = a^*(2) - a^*(1)$$

a*(1), b*(1), and L*(1): the color of a test piece prepared from a room-temperature-curing silicone rubber composition which had been aged for 7 days at 25° C., 50% RH was measured.

a*(2), b*(2), and L*(2): the color of a test piece prepared from a room-temperature-curing silicone rubber composition which had been aged for 18 weeks at 40° C., 95% RH was measured.

Preparation of Cured Sheet

A room-temperature-curable silicone composition was placed onto a Teflon® sheet and was uniformly dispensed until it became 2 mm thick. The product was retained for 7 days at 25° C. and 50% relative humidity (RH), after which a cured sheet was obtained. The surface exposed to the atmosphere was used as a "face side", and the surface in contact with the Teflon® sheet was used as a "back side".

Practical Example 1

65 parts by weight of α, ω-di(triethoxysilylethylene)dimethylpolysiloxane having viscosity of 60,000 mPa·s (represented by formula 1 below) and 35 parts by weight of α, ω-dimethyldimethylpolysiloxane having viscosity of 100 mPa·s (represented by formula 2 below) were combined with 100 parts by weight of precipitated calcium carbonate that contained 0.16 wt. % of iron oxide and which was surface treated with fatty acids to a BET specific surface area of 18 m²/g, 25 parts by weight of ground calcium carbonate that contained 0.19 wt. % of iron oxide surface treated with fatty acids to a BET specific surface area of 5.8, a cross-linking agent in the form of 2.8 parts by weight of methyltrimethoxysilane and 2.8 parts by weight of isobutyltrimethoxysilane, 2.5 parts by weight of curing catalyst in the form of a titanium-di(isopropoxy)bis-(ethylacetoacetate), and 1.0 part by weight of an adhesion promoter in the form of a reaction mixture of (γ-aminopropyl-trimethoxysilane and γ-glycidoxypropyl-trimethoxysilane (after mixing the γ-aminopropyltrimethoxysilane and γ-glycidoxypropyl-trimethoxysilane in a 1:2 mole ratio, the mixture was kept intact for four weeks at room temperature and under humidity of 50%). The components were then uniformly mixed under conditions hermetically sealed from atmospheric moisture.

Formula 1:

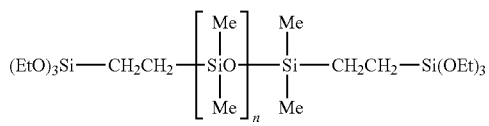

(where, Me designates a methyl group, and Et designates an ethyl group; n is an integer that provides viscosity at 25° C. within the range of 20 to 1,000,000 mPa·s Formula 2:

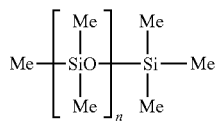

(where, Me designates a methyl group, and n is an integer that provides viscosity at 25° C. within the range of 20 to 1,000,000 mPa·s))

0.001 parts by weight of the mixed composition were combined and uniformly mixed with 10 parts by weight of (2-pyridylthio-1-oxide)zinc salt (Zinc Pyrithione) represented by Formula 3 given below and 90 parts by weight of a polydimethylsiloxane having molecular terminals capped with trimethylsiloxy groups and having a 3,000 mPas viscosity were uniformly stirred under conditions hermetically sealed from atmospheric moisture. As a result, a room-temperature-curable silicone rubber composition was prepared. The content of the obtained composition is shown in Table 1.

Formula 3

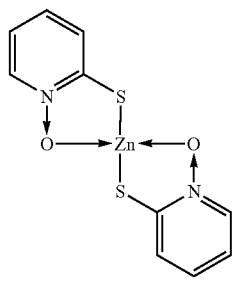

The obtained room-temperature-curable silicone rubber composition was loaded into a reliably sealed polyethylene cartridge which was held for 7 days in an oven at 25° C. and 50% RH, and then in an oven for 18 weeks at 40° C. and 95% RH. Following the 7-day and 18-day retentions, the composition was used for manufacturing cured sheets, and the face and back surfaces of the cured sheets were used for measuring color characteristics and color difference. The results of measurements are shown in Tables 2 and 3.

Practical Example 2

A room-temperature-curable silicone rubber composition was prepared by the same method as in Practical Example 1, with the exception that mixed composition was combined and uniformly mixed with 0.02 parts by weight of the mixture composed of 10 parts by weight of (2-pyridylthio-1-oxide) zinc salt (Zinc Pyrithione) and 90 parts by weight of a polydimethylsiloxane having molecular terminals capped with trimethylsiloxy groups and having a 3,000 mPas viscosity. The content of the obtained room-temperature-curable silicone rubber composition is shown in Table 1. The obtained room-temperature-curable silicone rubber composition was held for 7 days and for 18 weeks under the same conditions as in Practical Example 1, and then the face and back surfaces of the cured sheet were used for measuring color characteristics and color difference. The results of measurements are shown in Tables 2 and 3.

Practical Example 3

A room-temperature-curable silicone rubber composition was prepared by the same method as in Practical Example 1, with the exception that mixed composition was combined and uniformly mixed with 0.05 parts by weight of the mixture composed of 10 parts by weight of (2-pyridylthio-1-oxide) zinc salt (Zinc Pyrithione) and 90 parts by weight of a polydimethylsiloxane having molecular terminals capped with trimethylsiloxy groups and having a 3,000 mPas viscosity. The content of the obtained room-temperature-curable silicone rubber composition is shown in Table 1. The obtained room-temperature-curable silicone rubber composition was held for 7 days and for 18 weeks under the same conditions as in Practical Example 1, and then the face and back surfaces of the cured sheet were used for measuring color characteristics and color difference. The results of measurements are shown in Tables 2 and 3.

Practical Example 4

A room-temperature-curable silicone rubber composition was prepared by the same method as in Practical Example 1, with the exception that mixed composition was combined and uniformly mixed with 0.08 parts by weight of the mixture composed of 10 parts by weight of (2-pyridylthio-1-oxide) zinc salt (Zinc Pyrithione) and 90 parts by weight of a polydimethylsiloxane having molecular terminals capped with trimethylsiloxy groups and having a 3,000 mPas viscosity. The content of the obtained room-temperature-curable silicone rubber composition is shown in Table 1. The obtained room-temperature-curable silicone rubber composition was held for 7 days and for 18 weeks under the same conditions as in Practical Example 1, and then the face and back surfaces of the cured sheet were used for measuring color characteristics and color difference. The results of measurements are shown in Tables 2 and 3.

Practical Example 5

A room-temperature-curable silicone rubber composition was prepared by the same method as in Practical Example 1, with the exception that mixed composition was combined and uniformly mixed with 0.12 parts by weight of the mixture composed of 10 parts by weight of (2-pyridylthio-1-oxide) zinc salt (Zinc Pyrithione) and 90 parts by weight of a polydimethylsiloxane having molecular terminals capped with trimethylsiloxy groups and having a 3,000 mPas viscosity. The content of the obtained room-temperature-curable silicone rubber composition is shown in Table 1. The obtained room-temperature-curable silicone rubber composition was held for 7 days and for 18 weeks under the same conditions as in Practical Example 1, and then the face and back surfaces of the cured sheet were used for measuring color characteristics and color difference. The results of measurements are shown in Tables 2 and 3.

Practical Example 6

A room-temperature-curable silicone rubber composition was prepared by the same method as in Practical Example 1, with the exception that mixed composition was combined and uniformly mixed with 1.17 parts by weight of the mixture composed of 10 parts by weight of (2-pyridylthio-1-oxide) zinc salt (Zinc Pyrithione) and 90 parts by weight of a polydimethylsiloxane having molecular terminals capped with trimethylsiloxy groups and having a 3,000 mPas viscosity. The content of the obtained room-temperature-curable silicone rubber composition is shown in Table 1. The obtained room-temperature-curable silicone rubber composition was held for 7 days and for 18 weeks under the same conditions as in Practical Example 1, and then the face and back surfaces of the cured sheet were used for measuring color characteristics and color difference. The results of measurements are shown in Tables 2 and 3.

Comparative Example 1

A room-temperature-curable silicone rubber composition was prepared by the same method as in Practical Example 1, with the exception that mixed composition was not combined and mixed with the mixture composed of 10 parts by weight of ((2-pyridylthio-1-oxide) zinc salt (Zinc Pyrithione) and 90 parts by weight of a polydimethylsiloxane having molecular terminals capped with trimethylsiloxy groups and having a 3,000 mPas viscosity. The content of the obtained room-temperature-curable silicone rubber composition is shown in Table 1. The obtained room-temperature-curable silicone rubber composition was held for 7 days and for 18 weeks under the same conditions as in Practical Example 1, and then the face and back surfaces of the cured sheet were used for measuring color characteristics and color difference. The results of measurements are shown in Tables 2 and 3.

TABLE 1

|  | Practical Examples | | | | | | Comp. |
|  | 1 | 2 | 3 | 4 | 5 | 6 | Ex. 1 |
| --- | --- | --- | --- | --- | --- | --- | --- |
| α, ω-di (triethoxysilylethylene) dimethylpolysiloxane; viscosity of 60.000 mPa · s | 65.00 | 65.00 | 65.00 | 65.00 | 65.00 | 65.00 | 65.00 |

TABLE 1-continued

|  | Practical Examples | | | | | | Comp. Ex. 1 |
|---|---|---|---|---|---|---|---|
|  | 1 | 2 | 3 | 4 | 5 | 6 |  |
| α, ω-dimethyldimethylpolysiloxane; viscosity of 100 mPa·s | 35.00 | 35.00 | 35.00 | 35.00 | 35.00 | 35.00 | 35.00 |
| Precipitated calcium carbonate | 100.00 | 100.00 | 100.00 | 100.00 | 100.00 | 100.00 | 100.00 |
| Ground calcium carbonate | 25.00 | 25.00 | 25.00 | 25.00 | 25.00 | 25.00 | 25.00 |
| Methyltrimethoxysilane | 2.80 | 2.80 | 2.80 | 2.80 | 2.80 | 2.80 | 2.80 |
| Isobutyltrimethoxysilane | 2.80 | 2.80 | 2.80 | 2.80 | 2.80 | 2.80 | 2.80 |
| Titanium-di(isopropoxy)-bis(ethylacetoacetate) | 2.50 | 2.50 | 2.50 | 2.50 | 2.50 | 2.50 | 2.50 |
| γ-aminopropyltrimethoxysilane | 0.33 | 0.33 | 0.33 | 0.33 | 0.33 | 0.33 | 0.33 |
| γ-glycidoxypropyltrimethoxysilane | 0.66 | 0.66 | 0.66 | 0.66 | 0.66 | 0.66 | 0.66 |
| Trimethylsyloxy-capped polydimethylsiloxane (viscosity 3,000 mPa·s) | 0.0009 | 0.018 | 0.045 | 0.073 | 0.108 | 1.053 | — |
| ZPT | 0.0001 | 0.002 | 0.005 | 0.007 | 0.012 | 0.117 | — |
| Concentration of ZPT (ppm) in the weight of the entire composition | 5 | 10 | 20 | 30 | 50 | 500 | 0 |

(parts by weight)

ZPT is Zinc Pyrithion (bis(2-pyridylthio-1-oxide) zinc salt)

TABLE 2

Face Surface of the Sheet

Initial Period (following 7 days at 25° C. and 50% RH)

|  | Added amount of ZPT | L* | a* | b* |
|---|---|---|---|---|
| Practical Example 1 | 5 ppm | 92.46 | −0.56 | 2.97 |
| Practical Example 2 | 10 ppm | 92.42 | −0.51 | 2.97 |
| Practical Example 3 | 20 ppm | 94.62 | −0.27 | 3.27 |
| Practical Example 4 | 30 ppm | 94.48 | −0.32 | 3.26 |
| Practical Example 5 | 50 ppm | 92.35 | −0.43 | 2.66 |
| Practical Example 6 | 500 ppm | 92.98 | −0.40 | 1.88 |
| Comparative Example 1 | 0 ppm | 95.18 | −0.58 | 2.59 |

Retention in a cartridge container (18 weeks at 40° C. and 90% RH)

|  | Added amount of ZPT | L* | a* | b* | Δb | ΔE |
|---|---|---|---|---|---|---|
| Practical Example 1 | 5 ppm | 94.01 | −0.88 | 6.56 | 3.59 | 3.92 |
| Practical Example 2 | 10 ppm | 94.13 | −0.87 | 6.20 | 3.24 | 3.68 |
| Practical Example 3 | 20 ppm | 94.54 | −0.70 | 4.36 | 1.09 | 1.17 |
| Practical Example 4 | 30 ppm | 94.24 | −0.61 | 4.31 | 1.05 | 1.12 |
| Practical Example 5 | 50 ppm | 94.56 | −0.69 | 3.63 | 0.98 | 2.42 |
| Practical Example 6 | 500 ppm | 94.34 | −0.71 | 3.08 | 1.20 | 1.83 |
| Comparative Example 1 | 0 ppm | 93.90 | −1.01 | 6.73 | 4.14 | 4.24 |

ZPT is Zinc Pyrithion (bis(2-pyridylthio-1-oxide) zinc salt)

TABLE 3

Back Surface of the Sheet

Initial Period (following 7 days at 25° C. and 50% RH)

|  | Added amount of ZPT | L* | a* | b* |
|---|---|---|---|---|
| Practical Example 1 | 5 ppm | 94.05 | −0.49 | 2.96 |
| Practical Example 2 | 10 ppm | 94.33 | −0.49 | 2.90 |
| Practical Example 3 | 20 ppm | 93.87 | 0.17 | 2.38 |
| Practical Example 4 | 30 ppm | 93.51 | 0.23 | 2.05 |
| Practical Example 5 | 50 ppm | 94.69 | −0.41 | 2.67 |
| Practical Example 6 | 500 ppm | 91.53 | 0.10 | −0.70 |
| Comparative Example 1 | 0 ppm | 95.18 | −0.53 | 2.39 |

Retention in a cartridge container (18 weeks at 40° C. and 90% RH)

|  | Added amount of ZPT | L* | a* | b* | Δb | ΔE |
|---|---|---|---|---|---|---|
| Practical Example 1 | 5 ppm | 93.60 | −0.96 | 6.20 | 3.24 | 3.30 |
| Practical Example 2 | 10 ppm | 93.88 | −0.91 | 5.81 | 2.90 | 2.97 |
| Practical Example 3 | 20 ppm | 94.54 | −0.21 | 3.44 | 1.06 | 1.31 |
| Practical Example 4 | 30 ppm | 94.53 | −0.01 | 3.32 | 1.27 | 1.53 |
| Practical Example 5 | 50 ppm | 94.16 | −0.44 | 2.90 | 0.24 | 0.59 |
| Practical Example 6 | 500 ppm | 94.05 | −0.42 | 2.59 | 3.29 | 4.18 |
| Comparative Example 1 | 0 ppm | 93.97 | −0.92 | 6.58 | 4.19 | 4.37 |

ZPT is Zinc Pyrithion (bis(2-pyridylthio-1-oxide) zinc salt)

The invention claimed is:

1. A diorganopolysiloxane composition comprising:
   a source of iron(II) ions;
   0.0001-0.05 wt. % of a bis(2-pyridylthio-1-oxide) zinc salt; and
   an organo-titanium compound.

2. The composition according to claim 1, which comprises a condensation-reaction-curable diorganopolysiloxane composition.

3. The composition according to claim 1, further comprising an inorganic filler.

4. The composition according to claim 3, wherein said source of iron(II) ions is present in said inorganic filler.

5. The composition according to claim 1, wherein said source of iron(II) ions is iron (II) oxide.

6. The composition according to claim 3, wherein said inorganic filler is a calcium carbonate powder that contains iron oxide.

7. The composition according to claim 1, comprising:
   (A) 100 parts by weight of a diorganopolysiloxane base that contains the following components:
      (A-1) 20-100 wt. % of a diorganopolysiloxane capped at both molecular terminals with hydroxyl or hydrolysable groups;
      (A-2) 0-80 wt. % of a diorganopolysiloxane capped at one molecular terminal with hydroxyl or hydrolysable groups;
      (A-3) 0-80 wt. % of a diorganopolysiloxane that does not have hydroxyl or hydrolysable groups at both molecular terminals;
   (B) 1-300 parts by weight of a calcium carbonate powder that contains iron oxide as said source of iron(II) ions;
   (C) 0.5 to 30 parts by weight of a hydrolysable silane or a partially hydrolyzed product thereof; and
   (D) 0.001 to 10 parts by weight of said organo-titanium compound present as a curing catalyst.

8. The composition according to claim 1, wherein said organo-titanium compound is selected from the group of tetraisopropoxytitanate, tetra-t-butoxytitanate, titanium di(isopropoxy)bis(ethylacetoacetate), titanium-di(isopropoxy)bis(acetylacetonate), and combinations thereof.

9. A method of inhibiting or reducing discoloration of a diorganopolysiloxane composition comprising the step of mixing said composition with the following components in any order:
  i) a source of iron(II) ions;
  ii) 0.0001-0.05 wt. % per total weight of the composition of a bis(2-pyridylthio-1-oxide) zinc salt per total weight of the composition; and
  iii) an organo-titanium compound as a curing catalyst.

10. The method of inhibiting or reducing discoloration according to claim 9, wherein the source of iron(II) ions is iron (II) oxide.

11. The method of inhibiting or reducing discoloration according to claim 9, wherein the source of iron(II) ions is present in the diorganopolysiloxane composition in the form of an impurity in an inorganic filler.

12. The method of inhibiting or reducing discoloration according to claim 9 wherein there is provided a two part composition comprising a first part which comprises a diorganopolysiloxane polymer and the bis(2-pyridylthio-1-oxide) zinc salt and a second part which comprises a diorganopolysiloxane polymer and the source of iron (II) ions and said first part is mixed with said second part.

13. The method of inhibiting or reducing discoloration according to claim 9, wherein the organo-titanium compound is selected from the group of tetraisopropoxytitanate, tetra-t-butoxytitanate, titanium di(isopropoxy)bis(ethylacetoacetate), titanium-di(isopropoxy)bis(acetylacetonate), and combinations thereof.

14. A two part composition comprising a first part which comprises a diorganopolysiloxane polymer and a bis(2-pyridylthio-1-oxide) zinc salt and a second part which comprises a diorganopolysiloxane polymer and a source of iron (II) ions, wherein at least one of said parts further comprises an organo-titanium compound.

15. A two part composition according to claim 14 wherein said source of iron(II) ions is present as an impurity in an inorganic filler.

16. A two part composition according to claim 15 wherein said inorganic filler is calcium carbonate that contains iron oxide as said source of iron(II) ions.

17. A two part composition according to claim 14, wherein the organo-titanium compound is selected from the group of tetraisopropoxytitanate, tetra-t-butoxytitanate, titanium di(isopropoxy)bis(ethylacetoacetate), titanium-di(isopropoxy)bis(acetylacetonate), and combinations thereof.

* * * * *